(12) United States Patent
Haanketo et al.

(10) Patent No.: US 10,744,825 B2
(45) Date of Patent: Aug. 18, 2020

(54) MOULD FOR MAKING A WEAR INDICATOR INTO A PNEUMATIC TYRE AND A PNEUMATIC TYRE COMPRISING A WEAR INDICATOR

(71) Applicant: Nokian Renkaat Oyj, Nokia (FI)

(72) Inventors: Niko Haanketo, Nokia (FI); Jyrki Hietasaari, Nokia (FI)

(73) Assignee: NOKIAN RENKAAT OYJ, Nokia (FI)

( * ) Notice: Subject to any disclaimer, the term of this patent is extended or adjusted under 35 U.S.C. 154(b) by 453 days.

(21) Appl. No.: 15/468,207

(22) Filed: Mar. 24, 2017

(65) Prior Publication Data

US 2017/0282652 A1 Oct. 5, 2017

(30) Foreign Application Priority Data

Apr. 1, 2016 (EP) ..................... 16397509

(51) Int. Cl.
*B60C 11/24* (2006.01)
*B29D 30/06* (2006.01)

(52) U.S. Cl.
CPC .......... *B60C 11/24* (2013.01); *B29D 30/0662* (2013.01)

(58) Field of Classification Search
CPC .......................... B60C 11/24; B29D 30/0662
USPC ..................................... 152/154.2
See application file for complete search history.

(56) References Cited

U.S. PATENT DOCUMENTS

| 3,653,422 A | 4/1972 | French |
| 6,523,586 B1 * | 2/2003 | Eromaki ................ B60C 11/24 |
| | | 152/154.2 |
| 2005/0081971 A1 | 4/2005 | Heinen |
| 2009/0008009 A1 * | 1/2009 | Mosko .................... B60C 11/24 |
| | | 152/154.2 |
| 2010/0307650 A1 * | 12/2010 | De Benedittis ..... B60C 11/0306 |
| | | 152/209.18 |

(Continued)

FOREIGN PATENT DOCUMENTS

| EP | 1 066 991 A2 | 1/2001 |
| JP | 2006-232152 A | 9/2006 |
| WO | 2007/102790 A2 | 9/2007 |

OTHER PUBLICATIONS

European Search Report, dated Sep. 13, 2016, from corresponding EP application.

*Primary Examiner* — Robert C Dye
*Assistant Examiner* — Sedef E Paquette
(74) *Attorney, Agent, or Firm* — Young & Thompson (57) ABSTRACT

A pneumatic tyre with a wear indicator may be manufactured by inserting rods of a mould into the tire tread during manufacturing. A mould may include at least seven rods extending in parallel in a direction of height on a same side of an object and connected to the object. The rods are arranged so multiple distances are left between the cross sections of the rods and a minimum of the multiple distances ≥0.5 mm. In the direction of height, the cross section and/or the height of at least some of the rods varies so at a number of different height positions, the cross sections of the rods at those height positions define that number of different mirror-image symbols, of which mirror images are expressible by the wear indicator, one mirror-image symbol corresponding to one height position, with at least two different height positions and mirror-image symbols.

10 Claims, 7 Drawing Sheets

(56) References Cited

U.S. PATENT DOCUMENTS

| | | | | |
|---|---|---|---|---|
| 2015/0269468 A1* | 9/2015 | Butz | ...................... | B60C 11/24 |
| | | | | 235/462.11 |
| 2016/0221400 A1* | 8/2016 | Schimmoeller | ........ | B29D 30/68 |
| 2019/0375494 A1* | 12/2019 | Francois | ................. | B60C 11/24 |

* cited by examiner

MOULD FOR MAKING A WEAR INDICATOR INTO A PNEUMATIC TYRE AND A PNEUMATIC TYRE COMPRISING A WEAR INDICATOR

TECHNICAL FIELD

The invention relates to pneumatic tyres, such as car tyres. The invention relates to wear indicators of such tyres. The invention relates to wear indicators patterned to a tread of such a tyre. The invention relates to a moulds for making such a wear indicator into a tyre.

BACKGROUND

In order have a reasonably firm contact with road, grooves of a tread of a vehicle tyre need to be reasonable deep. Commonly, for safety reasons, the minimum groove depth is also governed by a national law. Naturally, when a tyre wears, the grooves become shallower. In order to determine the need for changing a tyre, different types of wear indicators may be employed onto the tread of a tyre. For a user, a wear indicator being capable of indicating the groove depth with a numerical value, such as an Arabic numeral, is informative.

An example of such a wear indicator is shown in US2005/0081971. According to that solution, as the tyre wears, different numbers are uncovered at different locations. However, such a wear indicator requires a lot of space from the tyre tread, as each number requires its own position. To reduce the size of the wear indicator, but still maintaining the readability, the document WO2007/102790 discloses a tyre with a wear indicator consisting of seven sipes with different depths. The depth of the sipes is designed in such a way that the appearance of the wear indicator changes from the symbol "8" to the symbol "6" and further to a symbol resembling "4", when the tyre wears.

A problem with the latter wear indicator is that the blades of the mould for making the sipes of the wear indicator prevent rubber from flowing into the mould, in particular to the inner corners thereof. Moreover, to provide more information to a user, a greater number of different symbols should be expressible with the wear indicator. Increasing the complexity of a mould used for making the wear indicator may involve a mould having a complex shape that is even harder to fill with rubber. The mould for such an indicator should be designed such that the flow of rubber during curing of the tyre is not prevented. Thus, the rubber should be able to easily flow and fill in the grooves, holes, and/or corners of the mould, if any. Still further, the wear indicator itself should not deteriorate the driving properties of the tyre. Moreover, the wear indicator should be small compared to the tyre tread patterns in order not to deteriorate the driving properties of the tyre.

SUMMARY

A new type of a wear indicator is presented. The wear indicator is comprised by a tyre, and can be made using a mould for the purpose. The mould comprises substantially parallel rods that are configured to penetrate into the tyre tread while making the wear indicator. To improve the flow of the rubber, the rods are arranged at least a distance apart from each other on a cross sectional plane of the rods. The mould may be an integral part of a mould for making a tyre. The mould may be a separate part attachable to a mould for making a tyre.

To increase the number of symbols expressible by the wear indicator, in an embodiment at least one of the rods of the mould has a cross section varying in the direction of the height of the rod. Thus, when the tyre tread wears, holes corresponding to different parts of the rods are subsequently uncovered. In this way, at a location corresponding to a rod, the cross section changes from large to small and/or vice versa as the tyre wears. In combination with other such rods, multiple different symbols are expressible with the wear indicator.

In an embodiment, at least one of the rods is made shorter, and a corresponding hole shallower. Thus, when the tyre has sufficiently worn, one of the holes of the wear indicator is completely removed.

Other preferable embodiments of the mould are presented in the other dependent claims.

When manufacturing a tyre having a wear indicator, a part of the mould is inserted to the uncured tyre to form the wear indicator thereto.

DETAILED DESCRIPTION

Figure 4A:
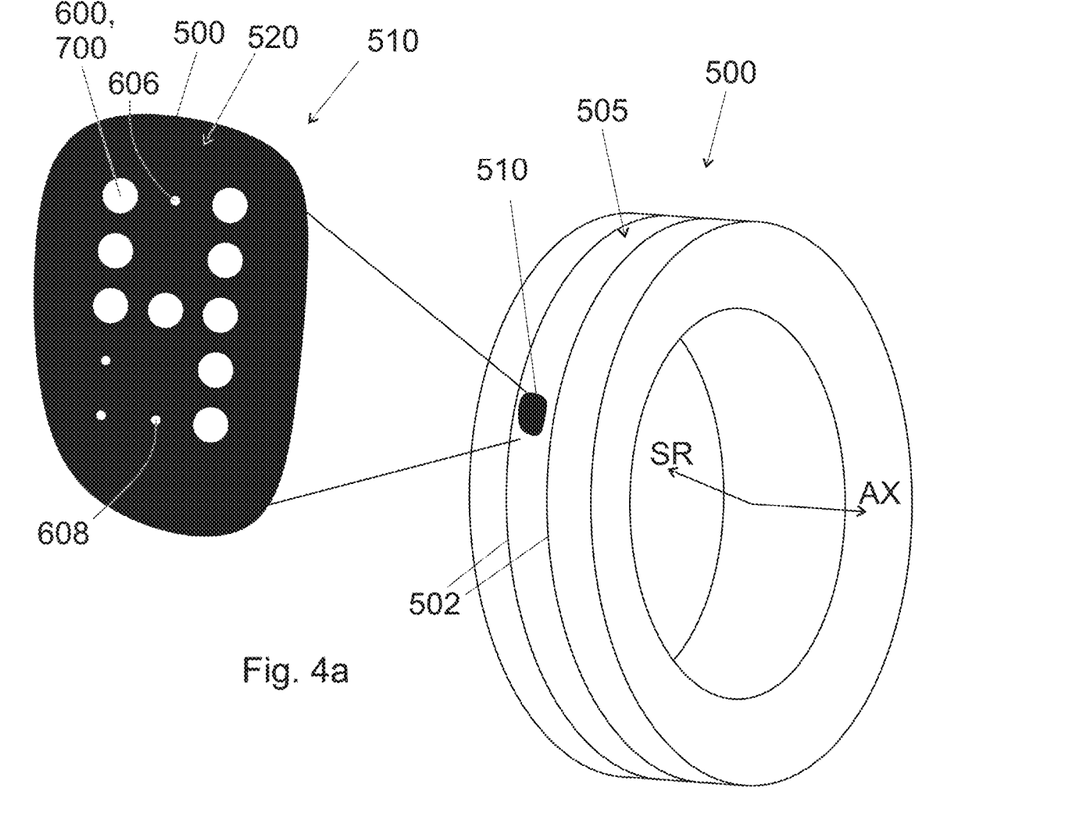
FIG. 4a shows a tyre having a wear indicator indicating a symbol resembling the Arabic numeral "4" (compare to FIGS. 2c and 2b)

FIG. 4a shows a tyre 500, i.e. pneumatic tyre 500 for a motor-vehicle, such as a passenger car. The tyre 500 is provided with a tread 505 including a wear indicator 510. The tyre tread 505 is formed by pattern parts in the form of circumferential ribs and/or in the form of blocks. In between the ribs/blocks, at least one circumferential groove 502 is arranged. The wear indicator 510 is arranged in the surface part of the tread 505 in the circumferential ribs or blocks, which are in contact with the road surface. The wear indicator 510 limits blind holes 600 running radially into tyre tread. The cross sections 700 of the blind holes 600, in combination, form a symbol 520 that the wear indicator 510 indicates.

Figure 1A:
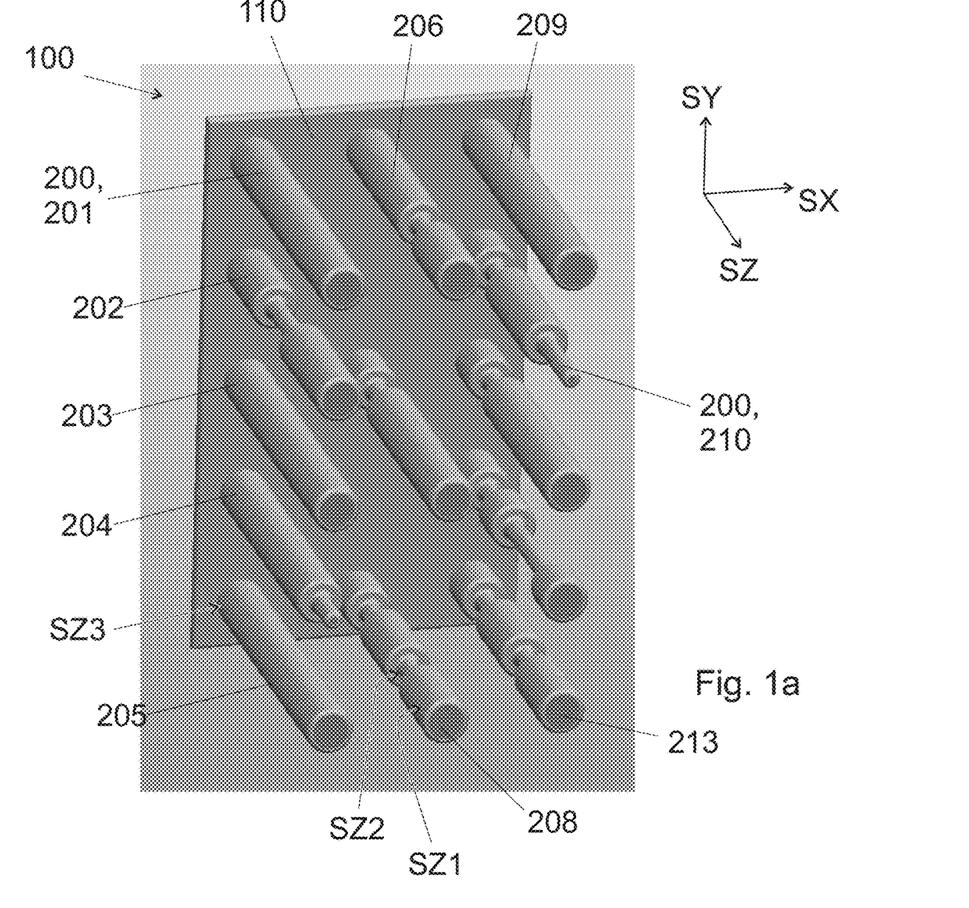
FIG. 1a Shows an embodiment of a mould for a wear indicator.
Figure 1B:
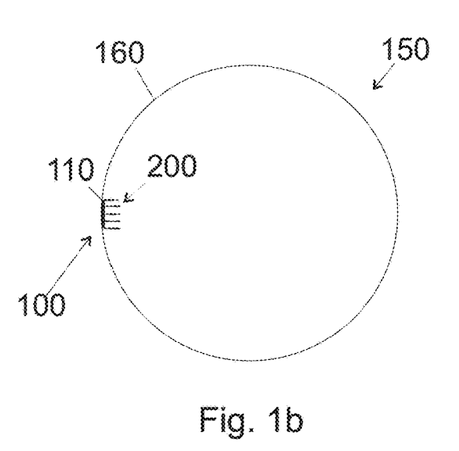
FIG. 1b shows a mould for a wear indicator attached to a tyre mould.
Figure 1C:
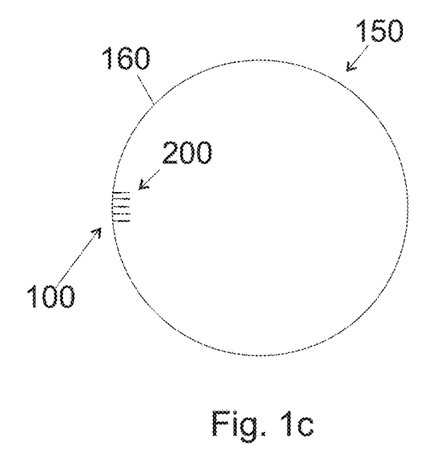
FIG. 1c shows a mould for a wear indicator being an integral part of a tyre mould.

With reference to FIGS. 1*a*, 1*b*, and 1*c* such a wear indicator 510 can be made by using a mould 100. Such a mould 100 is thus suitable for making a wear indicator 510 for a tyre 500 and into a tyre tread 505. When the rods 200 of the mould 100 are inserted into the tyre tread 505, e.g. while curing the tyre 500, and the mould 100 is subsequently removed from the tyre, a wear indicator 510 limiting the blind holes 600 corresponding to the rods 200 of the mould is formed. As known to a skilled person, the image formed by the rods 200 of the mould 100 (when viewed from above the rods 200 towards the direction of the base 110) is a mirror image of the symbol 520 represented by the wear indicator 510 (see FIGS. 2*b* and 2*c*). A mirror image of the symbol 520 (see FIG. 2*c*) represented by the wear indicator 510 will be referred to as a mirror-image symbol 120 (see FIG. 2*b*).

Referring to FIG. 1*a*, the mould 100 comprises an object 110, such as a base plate 110, and at least seven rods 200 extending in parallel in a direction SZ of height on a same side of the object 110 and connected to the object 110. In FIG. 1*a* the object 110 is a base plate 110. Such a separate mould can be attached to a tyre mould 150 as indicated in FIG. 1*b*. In the alternative, the rods 200 may extend from a tyre mould 150 without a separate base plate 110, as indicated in FIG. 1*c*. Thus, the mould may be an integral part of a tyre mould 150. Moreover, the object 110 may be the tyre mould 150 itself or a part thereof.

As for the terms, the term "height" refers to a height of a rod 200. The term "height position" refers to a position in or on the rod, in the direction of height. In a similar manner, the term "depth" refers to a depth a blind hole 600; and the term "depth position" refers to a position within the blind hole, in the direction of depth.

Figure 6A:
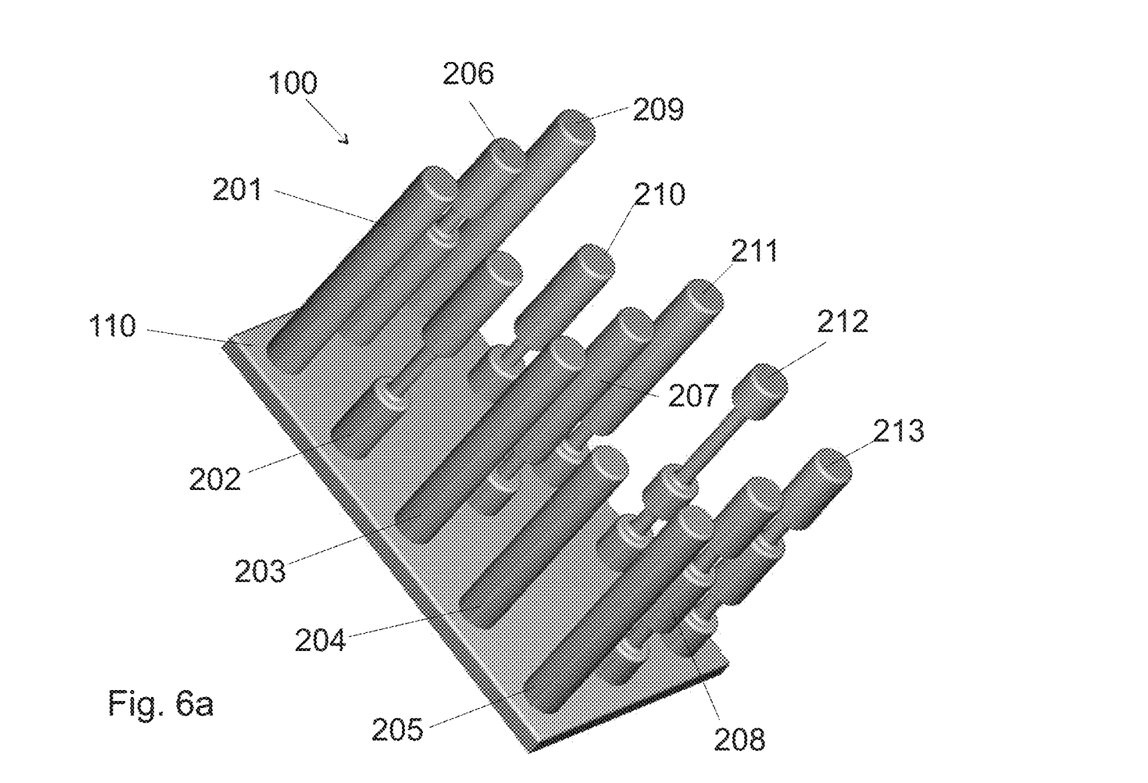
FIGS. 6a to 6c show embodiments of a mould for a wear indicator.
Figure 6B:
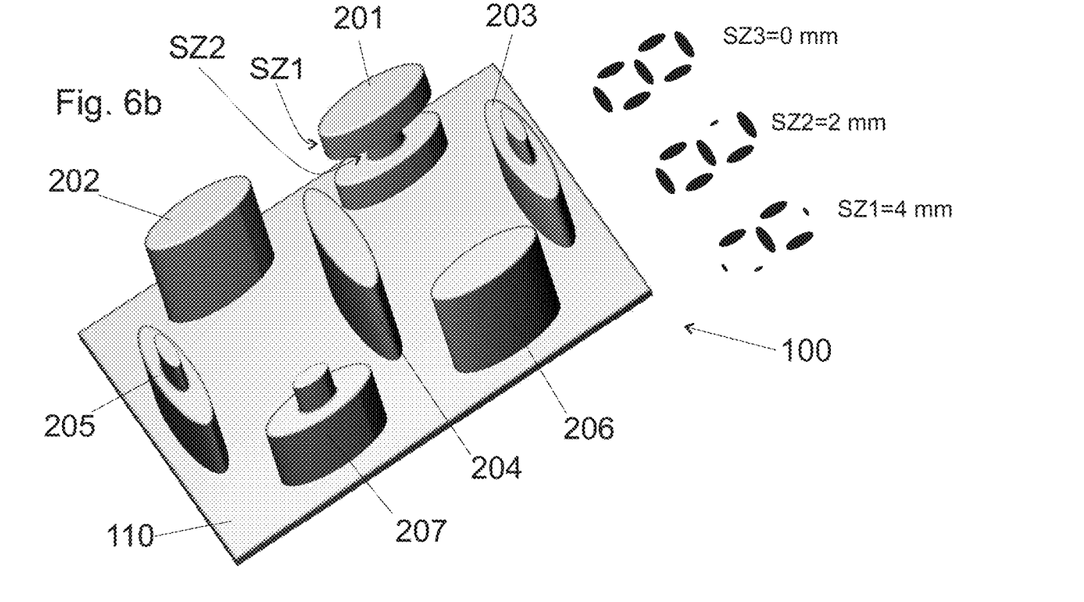
Figure 6C:
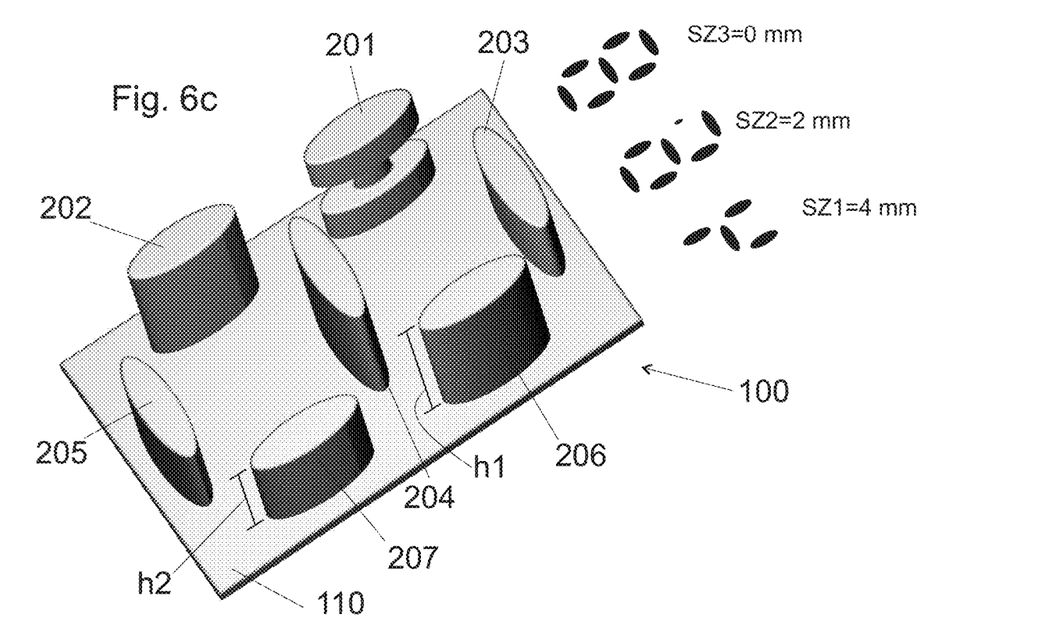

In FIG. 1*a*, the number of the rods 200 is thirteen. As indicated in FIGS. 6*b* and 6*c*, fewer rods, such as seven rods, suffices. The readability of the wear indicator and/or number of symbols expressible by the wear indicator may be improved by using more than seven rods. In order to withstand the curing of the tyre 500, at least the rods 200 are heat resistant to at least 200° C. Also the object 110 may be heat resistant up to this temperature. Preferably, the rods 200 are made of metal, such as steel. However, the rods 200 may be made of sufficiently heat resistant plastic or ceramic. Herein any or all of the rods is/are denoted by the reference 200, while the specific individual rods are referred to by the numbers 201, 202, 203, 204, . . . , 213.

Figure 2A:
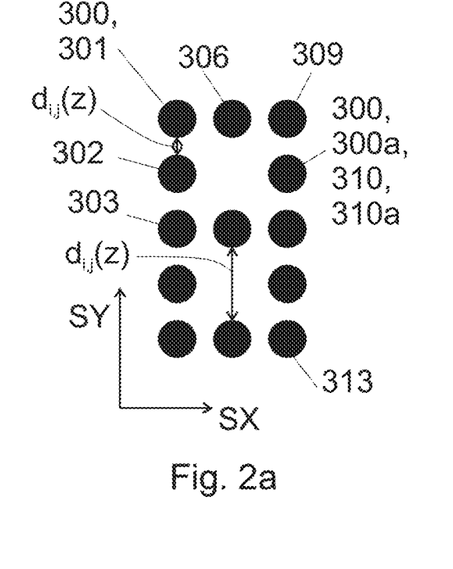
FIG. 2a shows a cross section of the mould of FIG. 1a corresponding to a height position SZ3.
Figure 2B:
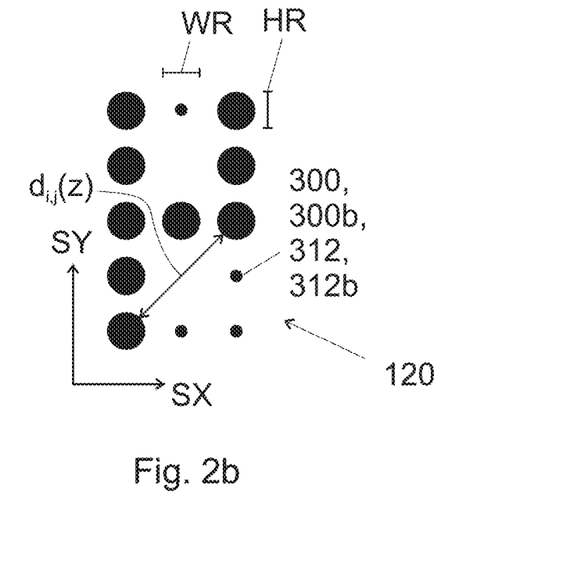
FIG. 2b shows a cross section of the mould of FIG. 1a corresponding to a height position SZ2.

To improve the flow of rubber during manufacturing of the wear indicator 510, the rods 200 are arranged a distance apart from each other. More specifically, the rods 200 are arranged such that a plane having surface normal parallel to the direction of height SZ and intersecting with at least some of the rods 200 defines the cross sections 300 of the rods 200 such that each cross section (300, 301, i) of a rod (200, 201) is separated by some distance $d_{i,j}(z)$ from another cross section (302, 306, j) of another rod (202, 206), wherein the cross sections are defined by the cross-sectional plane intersecting a rod 200 at a height position z. Herein any of the cross sections is denoted by the reference 300, while the individual cross sections are referred to by the number 301, 302, 303, . . . , 313, each one corresponding to the rod 201, 202, 203, . . . , 213, respectively. Such cross sections and the distances $d_{i,j}(z)$ are indicated in FIGS. 2*a* and 2*b*, for z=SZ3 and z=SZ2, respectively. The aforementioned plane is an imaginary plane for defining the cross sections at the height position z, and not a physical plane. Moreover, as will become clear, all the rods are not necessarily equally high, whereby, depending on the height, the plane does not necessarily intersect all the rods 200. The plane defining the cross sections 300 does not intersect the base 110.

A proper distance $d_{i,j}(z)$ between the cross sections is at least 0.5 mm, preferably at least 1 mm. Preferably this measure applies to all pairs of cross-sections 300, in particular all neighbouring cross sections. Also preferably this measure applies to all pairs of cross-sections 300 at all such height positions z of the cross-sectional plane, that define the at least seven cross sections. This improves the material flow during curing the tyre 500. More precisely said, each pair of cross sections defines a distance $d_{i,j}(z)$ that is left, in the plane of the cross section at the height position z, in between the two cross sections i and j. In this way, multiple distances $d_{i,j}(z)$ become defined, as indicated in FIGS. 2*a* and 2*b*. The minimum of these multiple distance is, in an embodiment, at least 0.5 mm and preferably at least 1 mm.

Also preferably, the rods are not hollow. In addition, preferably, none of the cross sections 300 surrounds another cross section 300. Preferably, each cross section 300 of a rod 200 is separated by at least the distance $d_{i,j}(z)$ from cross sections 300 of all the other rods 200.

To increase the amount of information obtainable from the wear indictor 510, at least some of the rods 200 are shaped such that in the direction SZ of the height, the cross section 300 and/or the height of at least some of the rods 200 varies in such a way, that at a number k of different height positions, the cross sections 300 of the rods 200 at those height positions $z_k$ define that number k of different mirror-image symbols 120, of which mirror images are expressible by the wear indicator 510, one mirror-image symbol 120 corresponding to one height position $z_k$, the number k of different height positions and mirror images being at least two, such as at least three or at least four. For example, a first one of the different height positions $z_k$ may equal the height position SZ1, a second one of the different height positions $z_k$ may equal the height position SZ2, and a third one of the different height positions $z_k$ may equal the height position SZ3 of FIG. 1*a*.

Preferably, for each height position $z_k$, the minimum of these multiple distances $d_{i,j}(z_k)$ is at least 0.5 mm, such as at least 1 mm. Herein the minimum is calculated over each pair (i,j) for the different cross-sections corresponding to different height positions $z_k$ of the cross sections. Also preferably, for each such height position z, that defines at least seven different cross sections 300, the minimum of these multiple distances $d_{i,j}(z)$ distance is at least 0.5 mm, such as at least 1 mm. Herein the minimum is calculated over each pair i,j for the different cross-sections corresponding to all different height positions z of the cross sections; i.e. for all 0<z<h2, wherein h2 is the minimum height of the rods 200 (see FIG. 6*c*), and the cross-sectional plane does not intersect the object 110 when z>0.

Multiple different height positions can be identified from a rod, e.g. the rod 208. Three height positions SZ1, SZ2, and SZ3 are depicted in FIG. 1*a*. As an example, FIGS. 2*a* and 2*b* indicate cross sections 300 corresponding to the height positions SZ3 and SZ2 (see also FIG. 1), respectively. The aforementioned minimum of the distances $d_{i,j}(z)$ applies, in particular, at all these different height positions SZ1, SZ2, and SZ3.

Referring to FIG. 2*a*, at the height position SZ3, the cross-sections 300 define a first mirror-image symbol 120, which resembles the mirror image of a numeral "8". Such a height position SZ3 is also depicted in FIG. 1a. As evident from FIG. 1a, a corresponding wear indicator 510 thus indicates a symbol resembling the number "8", when the tyre is new or has worn only a little.

Referring to FIG. 2b, at the height position SZ2, the cross-sections 300 define a second mirror-image symbol 120, which resembles the mirror image of a numeral "4". Such a height position SZ2 is also depicted in FIG. 1a. As evident from FIG. 1a, a corresponding wear indicator 510 thus indicates a symbol resembling the number "4", when the tyre has worn such an amount that the depth of the deepest groove corresponds to a measure of "4", e.g. the depth of the deepest groove may be at least 4 mm, such as from 4 mm to 5 mm corresponding to the embodiment of FIG. 1a, or from 4 mm to 6 mm corresponding to the embodiment of FIGS. 6b and 6c. This amount of wear corresponds to the height of the position SZ2, as measured from the base 110, provided that the mould 110 is used such that the base 110 makes a contact with the tyre tread 505 while manufacturing the wear indicator 510, but the base 110 does not penetrate into the tyre tread 505. As is evident, a mould 100 could be designed also so that the base 110 is further away from the tyre tread 505 during manufacturing.

When the tyre wears even more, e.g. to a level corresponding to the height position SZ1, the symbol corresponding to that height position may correspond to an even smaller Arabic numeral, such as "2".

The depth of the deepest groove of the tyre may be greater than the height of the rods (e.g. the height h1 of FIG. 6c). Correspondingly, the tyre may still have some grooves, even if the whole wear indicator has worn.

Regarding e.g. the rod 208 (or 213 or 210 or 206 or 202), in an embodiment, at least one of the rods is shaped in such a way that in the direction of height SZ, the cross section 300 of the rod varies in such a way that its cross section 300 is large 300a at a first height position SZ1 and small 300b at a second height position SZ2. Moreover, the second height position SZ2 is arranged in between the first height position SZ1 and the object 110. Still further, the cross section of the rod 208 (as well as any of 213, 210, 206, or 202) is large 300a at a third height position SZ3, wherein the second height position SZ2 is located in between the first height position SZ1 and the third height position SZ3. These height positions SZ1, SZ2, SZ3 are not necessary the same heights from one rod to another. However, within a rod, the sizes on the cross sections and the corresponding height positions are arranged as indicated above.

It is also noted that not all of the rods need to have a varying cross section. For example in the embodiment of FIG. 1a, the rods 201, 203, 205, and 209 have a constant cross-section throughout the height.

Figure 2C:
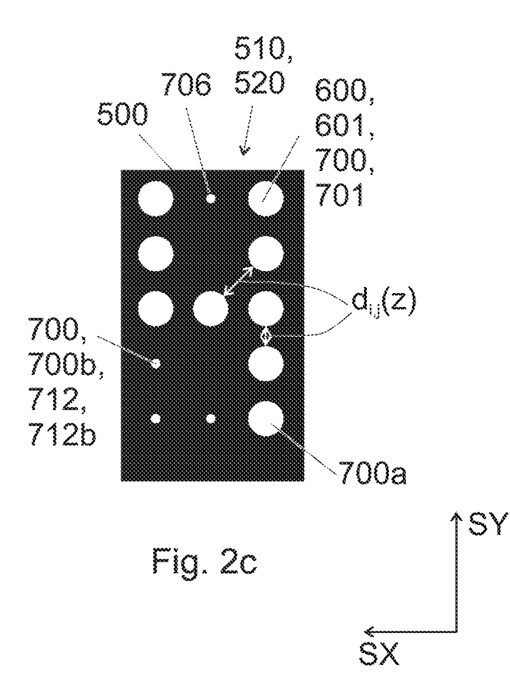
FIG. 2c shows a cross section of the wear indicator made by the mould of FIG. 1a at a depth corresponding to the height position SZ2 of FIG. 2b.
Figure 2D:
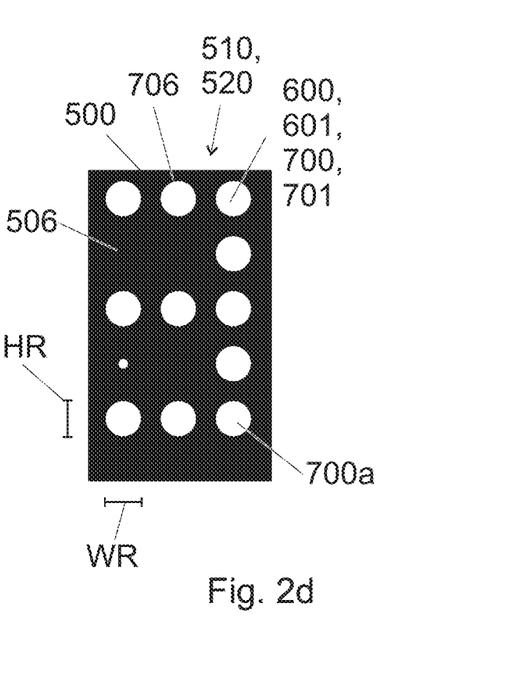
FIG. 2d shows a cross section of a wear indicator made by an embodiment of a mould.
Figure 2E:
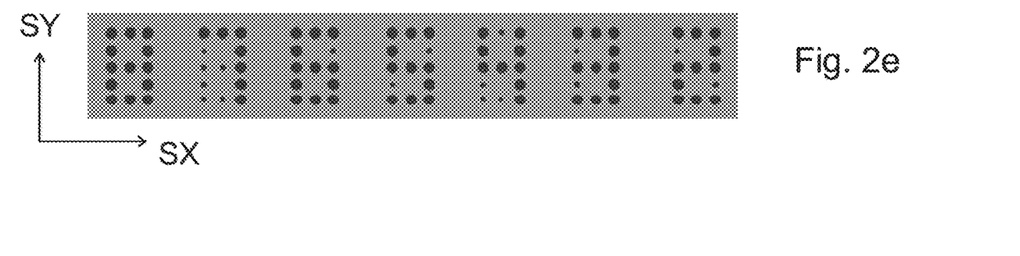
FIG. 2e shows cross sections of the wear indicator made using the mould of FIG. 1a at different depth positions.

Referring to FIG. 2c, the mirror image of the mirror-image symbol 120 of FIG. 2b is expressed by the wear indicator 510. As indicated above, in an embodiment, the cross section 300 and/or the height of at least some of the rods 200 varies in such a way that cross sections of the rods 200 define at least two mirror-image symbols 120: a first mirror-image symbol 120 at a first height position SZ1 and a second mirror-image symbol 120 at a second height position SZ2. The embodiment of FIG. 1a defines the mirror-images of the Arabic numerals 2, 3, 4, 5, 6, 7, and 8, i.e. seven different mirror images at seven different height positions, as indicated in FIG. 2e.

As indicated in FIG. 1a, in an embodiment, the all rods 200 have substantially equal height. For example, the proportional deviation of the height, in proportion to the average height, may be less than 10%. In the embodiment, the different symbols are expressible, since the cross-sections 300 of at least some of the rods 200 varies according to the height. Thus, in an embodiment, at least eleven of the rods 200 have a substantially equal height. For example, the proportional deviation of the height, in proportion to the average height, may be less than 10%.

However, instead of having a small cross section at the top, the rods 204 and 210 could be made shorter. A corresponding mould is shown in FIG. 6a. In that case, some of the symbols expressed by the wear indicator would not consist of large and small cross-sections 700, but would further include areas having no hole 600 at all at that location. A cross section of wear indicator 510 according to this embodiment is shown in FIG. 2d. At the location denoted by reference 506 no hole is present, because the corresponding rod 210 (see FIG. 6a) has been made shorter. In a similar manner, the rod 204 could be made shorter, whereby the symbol resembling the numeral "2" would be constituted by only holes with large cross sections (not shown).

Referring to FIGS. 1a and 2a-2f, in an embodiment, the mould 100 comprises thirteen rods 200. In the embodiment of FIG. 1a, the cross section 300 of nine rods 200 vary in such a way that cross sections of the rods 200 define seven different mirror-image symbols 120, a mirror-image symbol 120 at a height position; the mirror-image symbols resembling the mirror images of Arabic numerals 8, 7, 6, 5, 4, 3, and 2. Moreover, in the direction of height SZ, the cross section 300 of nine of the rods 200 varies in such a way that each of the at least nine cross sections 300 is large 300a at a first height position and small 300b at a second height position. Moreover, the large cross section 300a at least partly overlaps the small cross section 300b of the same rod. As indicated in FIG. 1a, preferably the large cross section 300a fully encompasses the small cross section 300b of the same rod. As an example, the cross section of the rod 208 is large at the first height position SZ1, small at the second height position SZ2, and large at the third height position SZ3. As indicated in FIG. 6a the cross section of at least eight rods is large at a first rod-specific height position SZ1, small at a second rod-specific height position SZ2, and large at a third rod-specific height position SZ3. Herein, for each rod, the second rod-specific height position SZ2 is arranged in between the first rod-specific height position SZ1 and the third rod-specific height position SZ3.

Typically, the different symbols are used to express the wear in millimetres. Therefore, in an embodiment, the second height position SZ2 is located at least 1 mm lower than the first height position SZ1, as measured from the surface of the object 110. Moreover, in an embodiment, the third height position SZ3 is located at least 1 mm lower than the second height position SZ2, as measured from the surface of the object 110. With reference to the rod 201 of FIG. 6b, in an embodiment, the second height position SZ2 is located 2 mm lower than the first height position SZ1, as measured from the surface of the object 110; and the third height position SZ3 is located 2 mm lower than the second height SZ3.

In an embodiment, the area of the large cross section 300a is at least 1.5 times the area of the small cross section 300b of the same rod. Preferably, the ratio of the area of the large cross section 300a to the area of the small cross section 300b of the same rod is at least two, more preferably at least three, and even more preferably at least four. A larger ratio improves the readability, but on the other hand makes the rods more vulnerable to mechanical failure and removal of tyre from the mould more difficult. The ratio of the areas may be e.g. at most hundred or at most fifty. What has been said about the cross sections 300 of the rods 200 applies also to the cross sections 700 of the blind holes 600.

Figure 2F:
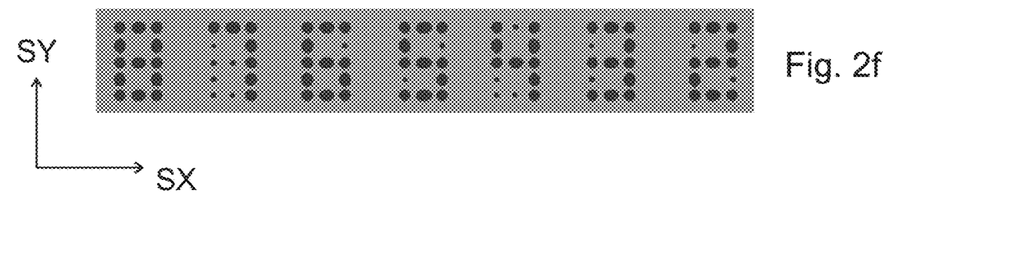
FIG. 2f shows cross sections of the wear indicator made using another mould at different depth positions.

As indicated in FIGS. 2a-2e, the cross sections 300 may be circular. In particular, the large cross sections 300a may be circular. As indicated in FIG. 2f, the cross sections 300 may be oval. In particular, the large cross sections 300a may be oval. The small cross sections 300b may also be circular or oval. A circular or oval shape improves the flow of the rubber into the holes or grooves of the mould 100. In particular, when the cross section is both large and small (at different heights), the groove formed by the small cross section should be filled with rubber.

Figure 3:
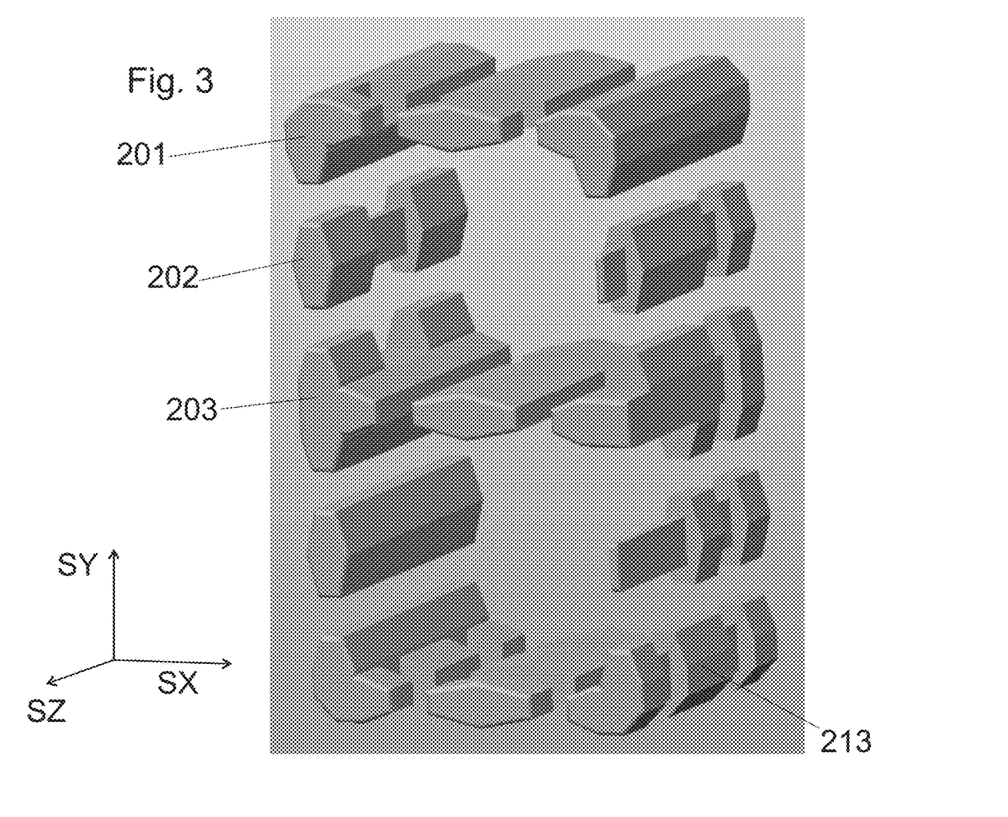
FIG. 3 shows an embodiment of a mould for a wear indicator.

As indicated in FIG. 3, the rods 200 may have also different shape to improve the readability of the wear indicator. In FIG. 3, the large cross-section is polygonal, and the small cross-section is rectangular. Even if not shown in the figures, the shape of a large cross-section may be e.g. a convex polygon, such as regular convex polygon, such a rectangle or a triangle. Also the shape of a small cross-section may be e.g. a convex polygon, such as regular convex polygon, such a rectangle or a triangle.

Preferably, the cross section of the rod changes from small to large or vice versa within a small distance. This improves identifying the symbol 510 of the wear indicator, since then the wear indicator of the tyre would only rarely have a blind hole that would not be clearly either large or small. Typically the small distance is at most 1 mm. In an embodiment, the cross section 300 is large 300a at a first height position SZ1 and small 300b at a second height position SZ2; wherein the second height position SZ2 is at most 2 mm, at most 1 mm, at most 0.5 mm, or at most 0.25 mm smaller than the first height position SZ1.

Figure 5A:
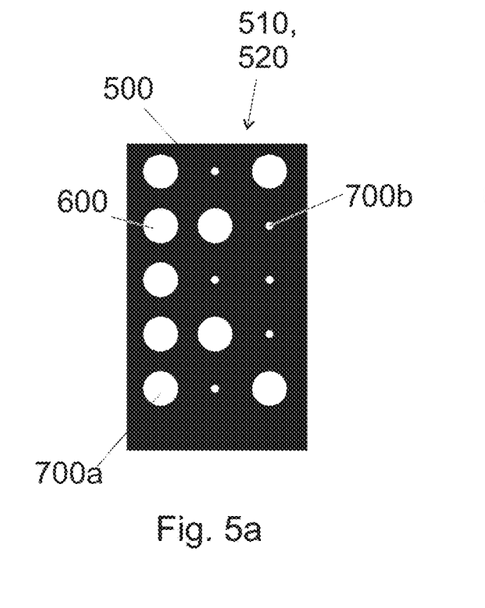
Figure 5B:
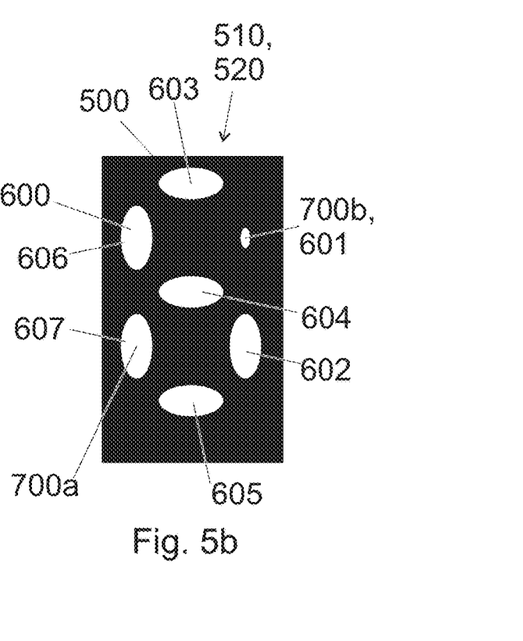

FIGS. 5a-5e show different embodiments of a wear indicator 510 that can be manufactured by a mould 100 comprising rods 200. A mould corresponding to the wear indicator of FIG. 5b is shown in FIG. 6b. Moulds corresponding to the embodiments of FIGS. 5a, 5c, 5d, and 5e are considered obvious in view of the present disclosure and thus not shown.

The wear indicator of FIG. 5a comprises fifteen blind holes 600 having cross sections 700. At a certain depth position, some of the cross sections 700 are large 700a and some are small 700b. Compared to the wear indicator of FIG. 2c, a greater number of different symbols, including letters, are expressible. As indicated above, some of the rods 200 may be shorter than the others, depending on the symbols to be expressed.

The wear indicator of FIG. 5b comprises seven blind holes 600 having cross sections 700. At a certain depth position, some of the cross sections 700 are large 700a and some are small 700b. Compared to the wear indicator of FIG. 5a, a smaller number of different symbols are expressible; however, all the numbers from 0 to 9 are expressible, provided that the cross sections of the blind holes 600 (and the rods 200 of the mould 100) varies accordingly. The less different symbols are needed, the simpler is the design of the mould 100.

Not necessarily all the rods 200 have a varying cross-section. For example, if only the symbols "8", "6", "4", and "2" should be expressed with the wear indicator of FIG. 5b, one or two of the rods need not to have a varying cross section. As an example, in such a case, the rod 200 corresponding to the central blind hole 604 of this indicator can be large throughout the whole height. Moreover, the rod 200 corresponding to the lower right blind hole 602 of the symbol can, in this case, be made shorter instead of varying the cross-section. Thus, in such an embodiment, in the direction of height SZ, the cross section 300 of five of the rods 200 varies in such a way that each of the at least five cross sections 300 is large 300a at a first height position and small 300b at a second height position. As for a corresponding tyre, in the radial direction SR, the cross sections 700 of five of the blind holes 600 vary in such a way that each cross section 700 of the five blind holes 600 is large 700a at a first depth position and small 700b at a second depth position.

In some applications, it may suffice to indicate the numerals "8", "6", and "4" by the wear indicator of FIG. 5b. An example of a corresponding mould 100 is shown in FIG. 6b. As an example, in such a case, the rods 206, 204, and 202 corresponding to the holes 606, 604, and 602 of this indicator can be large throughout the whole height. Moreover, the rods 203, 205, and 207 corresponding to the holes 603, 605, and 607 can be either short with a constant cross section, or these rods can have a varying cross section. FIG. 6c shows the embodiment, wherein these rods are shorter than the other rods. FIG. 6b shows the embodiment, wherein these rods are as tall as the other rods, but their cross-section vary as discussed above. Even if not shown in the FIGS. 6b and 6c, is it evident, that in the alternative, one or two of these rods 203, 205, 207 may have a full height with a varying cross section and the other(s) of these three rods 203, 205, 207 may be short.

Even in this case, one rod, in particular the rod 201 corresponding to the hole 601 (see FIGS. 6b and 6c), has a varying cross section. Thus, in this embodiment, in the direction of height SZ, the cross section 300 of one of the rods 200, the rod 201, varies in such a way that cross section 300 is large 300a at a first height position and small 300b at a second height position. Moreover, the second height position is located in between the first height position and the object 110 such as the base 110. In the corresponding tyre, in the radial direction SR, the cross section 700 of at least one of the blind holes 600 vary in such a way that the cross section 700 of the blind hole 600 is large 700a at a first depth position and small 700b at a second depth position. Moreover, the second depth position is left in between the first depth position and the surface of the tyre tread 505. Furthermore, the cross section 300 of the rod 201 varies in such a way that the cross section 300 is large 300a at a third height position such that the second height position is located in between the first and the third height positions.

In the embodiment of FIGS. 6a and 6c, a first one (e.g. 201) of the at least seven rods 200 has a first height h1, and a second one (e.g. 204 or 210 in FIG. 6a; or 203, 205, or 207 in FIG. 6c) of the at least seven rods 200 has a second height h2, wherein the second height h2 is less than the first height h1, i.e. h2<h1. The embodiment of FIG. 6a comprises a rod 204 of which second height h2 is less than the first height h1 by 1 mm. Thus, in an embodiment, the second height is less than the first height by at least 1 mm. The embodiment of FIG. 6a further comprises a rod 210 of which second height is less than the first height by 2 mm. Thus, in an embodiment, the second height is less than the first height by at least 2 mm. Also the embodiment of FIG. 6c comprises a rod 203 of which second height is less than the first height by 2 mm.

Figure 6D:
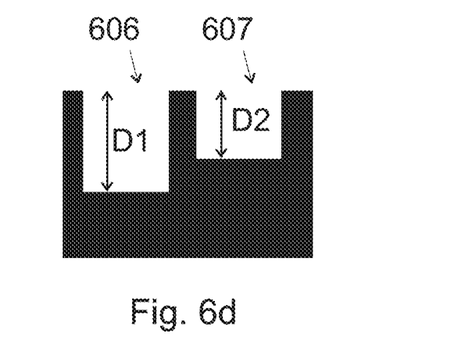
FIG. 6d shows two blind holes made by the mould of FIG. 6c.

FIG. 6d, shows, in a side view, two of the blind holes made by the mould of FIG. 6c. These blind holes are a part of a wear indicator 510 of a tyre 500. The wear indicator 510 comprises a first blind hole 606 having a first depth D1 and a second blind hole 607 having a second depth D2. The second depth D2 is less than the first depth D1 (i.e. D2<D1).

The second depth D2 may be less than the first depth D1 by at least 1 mm or at least 2 mm (i.e. D1-D2>1 mm or D1-D2>2 mm).

Figure 5C:
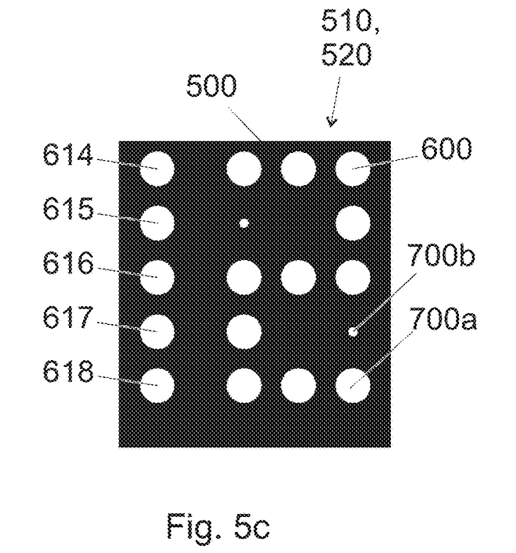

The wear indicator of FIG. 5c comprises eighteen blind holes. Five of the blind holes, i.e. the blind holes 614-618, depict the number "1" for indicating numbers more than nine, and the other thirteen blind holes correspond to those of FIGS. 2a and 2b. It is also noted that the five blind holes 614-618 depicting the number "1" can be made e.g. using five short rods. Thus, when the tyre tread wears, the number "1" also completely wears away without leaving smaller holes. In the alternative, the cross section of the blind holes 614-618 may e.g. change from large to small at a certain depth position, when viewed in the radial direction towards the axis AX of rotation. Moreover, the five holes 614-618 depicting the numeral "1" can also be replaced with fewer blind holes 600, such as only one blind hole 600, the blind hole having a large aspect ratio.

Figure 5D:
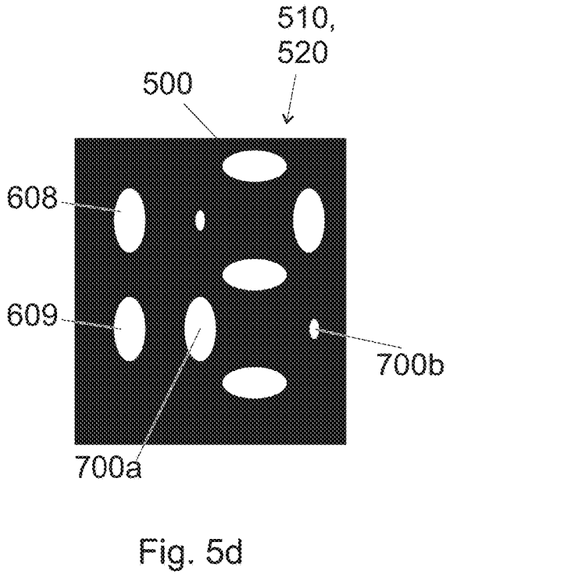

The wear indicator of FIG. 5d corresponds to that of FIG. 5b with the inclusion of number "1" (see FIG. 5c). The wear indicator of FIG. 5d comprises nine blind holes. As indicated in connection with FIG. 5c, the blind holes 608 and 609 may be shallower than the other blind holes 600. As indicated in connection with FIG. 5c, the blind holes 608 and 609 may be replaced with only one blind hole.

Figure 5E:
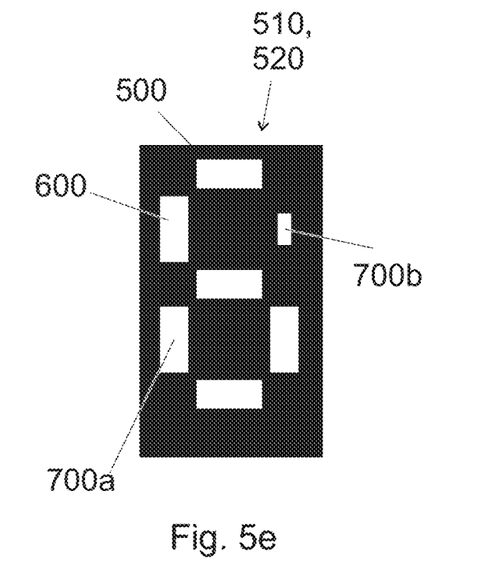

The wear indicator of FIG. 5e corresponds to that of FIG. 5b, but the blind hole 600 has a different type of cross section. The cross section of FIG. 5e is rectangular. As indicated above, also other shapes may be used.

As indicated in FIGS. 2a-2e, the cross sections 700 of the blind holes 600 may be circular. As indicated in FIGS. 2f, 5b, and 5c, the cross sections 700 may be oval. As indicated in FIGS. 3 and 5e, the cross sections 700 may have also different shape. For example, a polygonal shape of FIG. 3 may improve the readability of the wear indicator 510.

In some embodiments, at least some of the mirror-image symbols 120 represent mirror images of Arabic numerals. In an embodiment, all the mirror-image symbols 120 represent mirror images of Arabic numerals. In an embodiment, all the Arabic numerals from 0 to 9 are expressible as mirror images of the mirror-image symbols. As indicated in FIG. 2a, in addition to Arabic numerals, also other symbols 520, such as letters, may be expressible with the wear indicator 510.

Preferably, the number of different symbol 520 expressible by the wear indicator 510 is at least three, at least four, at least five, at least six, or at least seven. As indicated above, the symbols 520 themselves are mirror images of the mirror-image symbols 120. As indicated in FIGS. 2e and 2f, most preferably, at least the Arabic numerals 2, 3, 4, 5, 6, 7, and 8 are expressible with the wear indicator 510. However, the wear indicator need not to be accurate, at least when the tyre is new. Thus, it may suffice that only the Arabic numerals 4, 6, and 8; or 2, 4, 6, and 8; or 2, 3, 4, 6, and 8 are expressible with the wear indicator 510.

Such Arabic numerals may be indicative of the depth in millimetres of the grooves 502 of the tyre tread 505. For example a symbol "6" may be indicative of a groove depth of 6 units, such as at least 6 mm, such as from 6 mm to 8 mm or from 6 mm to 7 mm.

To have a reasonably wide range of indication of wear, the height h1 or h2 of a rod 200, as measured from the base 110 to the tip of the rod 200, is at least 4 mm, preferably at least 5 mm. In case the wear indicator has rods with different lengths, the height h1 of the highest rod 200 may be at least 4 mm or at least 5 mm.

As indicated above (see in particular the holes 614-618 of FIG. 5c), some of the rods may be shorter. As indicated above, in an embodiment, the height of each of at least four of the rods 200 is at least 4 mm, preferably at least 5 mm. The number four corresponds to the embodiment discussed in connection with FIG. 6b, wherein three of the rods may be made shorter. In an embodiment, the height of each of at least eleven of the rods 200, is at least 4 mm, preferably at least 5 mm. The number eleven corresponds to the embodiment of FIG. 1a, wherein the rods 210 and 204 is made shorter. Moreover, in an embodiment, the height of the rod 200 and the depth of the blind hole 600 is at most 20 mm, such as at most 18 mm.

The thickness of the rods 200 may depend on the type and/or size of the tyre 500 wherein the wear indicator is applied. In general, a rod 200 has a first width WR and a second width HR, both measured in the plane having a surface normal parallel to the direction of height SZ, and the first and the second width being perpendicular to each other (see FIGS. 2b and 2c). As is evident, these measures correspond to the widths of the cross section 300; and thereby may depend on the height position SZ. To ensure readability of the symbols, sufficient strength of the mould 100, and reasonable size of the wear indicator of a passenger car tyre, preferably, the first width WR is from 0.3 mm to 3 mm. Preferably, the second width HR is from 0.3 mm to 3 mm. Also preferably, the area of the cross section 300 is from 0.07 mm² to 10 mm². The area of the cross section 300 may be from e.g. 0.2 mm² to 7 mm². These values apply to areas corresponding to large cross sections and areas corresponding to small cross sections. Similar measures apply to the blind holes 600 and their cross sections 700, 700a, 700b. In a typical passenger car tyre, the cross-sectional area of the whole wear indicator 510 is at most 650 mm² such as at most 400 mm². However, in other types of tyres, the width WR of a rod may be e.g. up to 10 mm and the height may be e.g. up to 10 HR may be e.g. up to 10 mm. Moreover, the cross-sectional area of the wear indicator may be e.g. up to 100 cm².

It has also been observed that a blind hole 600 having a large aspect ratio softens the tyre tread 505 a lot. The aspect ratio WR/HR here refers to ratio of the first width WR of a cross section 300, 700 to the second width HR of the cross section 300, 700 (see FIG. 2b). The widths WR and HR may be defined so that WR>HR. Thus, the aspect ratio of e.g. a circle is one, and the aspect ratio may be larger for other shapes. In particular, when the aspect ratio is large, the blind holes 600 of the wear indicator work as sipes, which effectively allow the tread to deform. In contrast, when the aspect ratio of the cross section 300 of the rod 200 is close to one, such deformations require a greater force.

It has been found that preferably, the aspect ratio HR/WR of the cross section 300 of all the rods 200 is at most 7 (i.e. from 1/7 to 7, if the orientation of HR and WR can be freely chosen). When the cross section depends on the height position, this limit applies in particular to the small cross section 300b, because of the mechanical vulnerability of the rods. However, this limit applies in also to the large cross section 300a, because of the large cross sections affect the mechanical properties of the tyre tread 505. More preferably, the aspect ratio HR/WR of the cross section 300 of all the rods 200 is at most 5 or at most 3, at least at the height positions corresponding to small cross sections and preferably also at the height positions corresponding to large cross sections.

Referring to FIG. 4a, a tyre 500 comprises a wear indicator 510 having been made by the aforementioned mould 100, 150. As indicated in FIGS. 4a and 2c, e.g. the symbol "4" can be expressed using nine large blind holes (corresponding to large cross sections 300a of the rods 200 of FIG. 2b) and four small blind holes (corresponding to small cross sections 300b of the rods 200 of FIG. 2b).

A tyre 500 is in use configured to roll about an axis AX of rotation. A tyre 500 comprises a tread 505 arranged, in use, to make a rolling contact with a surface, such as a surface of a road. The tread 505 defines a wear indicator 510 extending from the outer surface of the tread 505 into the tread 505. In an embodiment, the wear indicator 510 defines at least seven blind holes 600 (FIGS. 2c, 4a, 5a-5d) extending from the outer surface of the tread 505 into the tread 505 in a radial direction −SR perpendicular to the axis AX of rotation. The blind holes 600 are such shaped that a plane having surface normal parallel to the radial direction SR and intersecting with the blind holes 600 defines the cross sections 700 of the blind holes 600 such that each cross section (700, 701, i) of a blind hole (600, 601) is separated by some distance $d_{i,j}(z)$ from all the other cross sections (702, 706, j) of the other blind hole (602, 606) at a depth position z. At each depth position z, each pair (i,j) of blind holes defines a distance $d_{i,j}(z)$, whereby multiple distances becomes defined. What has been said above about the minimum distance $d_{i,j}(z)$ between the pairs of the rods 200 applies also to the minimum of these distances $d_{i,j}(z)$ between the cross sections 700 of the blind holes 600.

Herein the reference 600 refers to blind holes in general, and the references 601, 608, 609, 614, 615, 616, 617, 618 refer to the blind holes made using the respective rods. Moreover, the cross sections 701, 706, 712 correspond to the cross sections of the respective blind holes 701, 706, and 712.

In the radial direction SR, the cross section 700 and/or the depth of at least some of the blind holes 600 varies in such a way, that at a number of different depth positions, the cross sections 700 of the blind holes 600 at those depth positions define that number of different symbols 520 expressible by the wear indicator 510, one symbol 520 corresponding to one depth position, the number of different depth positions and different symbols 520 being at least two. More preferably, the number of different symbols 520 expressible by the wear indicator 510 is at least three, at least four, at least five, at least six, or at least seven.

As indicated above and in the Figures, in an embodiment, the number of blind holes 600 is at least nine. In an embodiment, the number of blind holes 600 is only nine. In other embodiment, the number of blind holes 600 may be at least thirteen or only thirteen; at least fifteen or only fifteen; or at least eighteen or only eighteen.

Figure 4B:
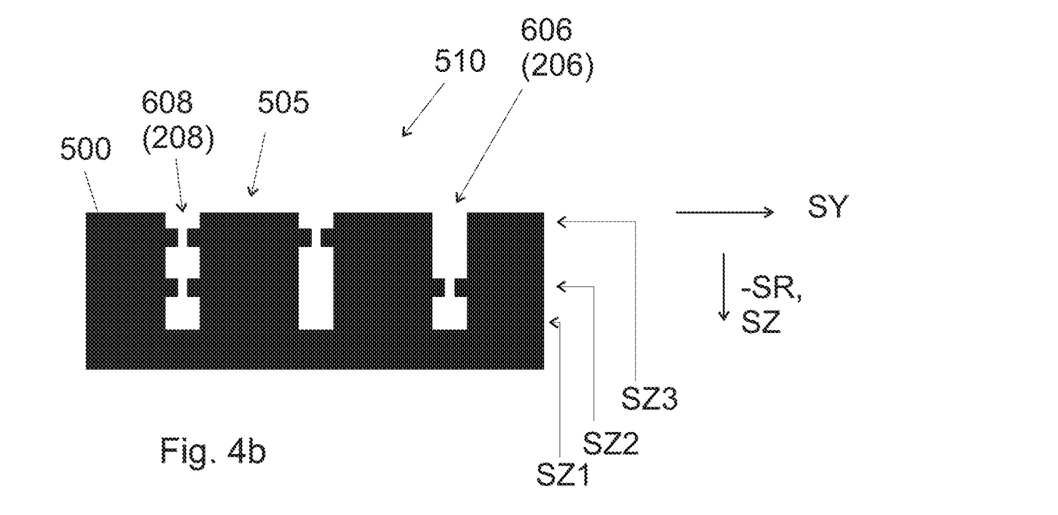
FIG. 4b shows, from a side view, three of the blind holes of a wear indicator of a tyre having been made by the mould of FIG. 1a, FIGS. 5a-5e show symbols expressible with embodiments of a wear indicator.

FIG. 4b shows, in a side view, three of the blind holes 600 of a wear indicator made by the mould of FIG. 1a. In particular, the blind holes 608 (corresponding to the rod 208) and 606 (corresponding to the rod 206) are indicated by reference numeral. The blind holes 600 extend into the tyre 500 from the tyre tread 505 in the negative radial direction −SR. For clarity, the directions of the mould of FIG. 1a are also indicated in the Figure, corresponding to the situation, when the mould in inserted in the tyre 500. Moreover, the three different height positions SZ1, SZ2, and SZ3 of FIG. 1a are also shown in this figure. These height positions define depth positions within the blind holes 600. When the wear indicator expresses the numeral "4", as in FIG. 4a, the tyre has worn such an amount that the all parts of the tyre tread 505 above the depth corresponding to height position SZ2 have worn out. Thus, the visible cross sections 700 of the blind holes 606 and 608 are small, as indicated also in FIG. 4a. Moreover, the cross section 700 of the central blind hole is large, as evidenced by FIGS. 4a and 4b.

As indicated above in connection with FIG. 5b, in an embodiment, the cross section 700 of at least one of the blind holes 600 varies in such a way that the cross section 700 of the blind holes 600 is large 700a at a first depth position and small 700b at a second depth position. In an embodiment, the second depth position is left in between the first depth position and the radially outermost cross section of the blind hole, the cross section being on a radially outermost plane having a surface normal parallel to the depth of the blind hole and intersecting with the blind hole. In an embodiment, the first depth position is arranged at least 1 mm deeper in the blind hole than the second depth position.

Moreover as indicated in FIG. 1a, in an embodiment in the radial direction SR, the cross section 700 of at least one of the blind holes 600 vary in such a way that the cross section 700 of the blind hole 600 is large 700a at a first depth position, small 700b at a second depth position, and large 700a at a third depth position, wherein the second depth position is located in between the first depth position and the third depth position. Here, the first depth position may be arranged at least 1 mm deeper in the blind hole than the second depth position, and the second depth position may be arranged at least 1 mm deeper in the blind hole than the third depth position. What has been said above about the mutual arrangement of the corresponding height positions SZ1, SZ2, and SZ3 applies to the depth positions.

When the wear indicator of FIG. 5b is configured to express all the numerals 2, 3, 4, 5, 6, 7, and 8, five of the blind holes (606, 601, 604, 607, and 605) may have a cross-section varying in the aforementioned way. Moreover, in the wear indicator made by the mould of FIG. 1a, eight of the blind holes may have a cross-section varying in the aforementioned way. Thus, in an embodiment in the radial direction SR, the cross section 700 of at least five one of the blind holes 600 vary in such a way that the cross section 700 of the blind hole 600 is large 700a at a first hole-specific depth position, small 700b at a second hole-specific depth position, and large 700a at a third hole-specific depth position, wherein, in each blind hole 600, the second hole-specific depth position is located in between the first hole-specific depth position and the third hole-specific depth position. These hole-specific depth positions are not necessarily same from one of the at least five blind holes to another. What has been said about the difference between the different depths above applies also in this case.

Correspondingly in an embodiment of a mould, in the direction of height SZ, the cross section 300 of at least five of the rods 200 varies in such a way that the cross section 300 is large 300a at a first rod-specific height position SZ1, small 300b at a second rod-specific height position SZ2, and large 300a at a third rod-specific height position SZ3, wherein, in each rod, the second rod-specific height position SZ2 is located in between the first rod-specific height position SZ1 and the third rod-specific height position SZ3. In each rod, the second rod-specific height position SZ2 may be located at least 1 mm lower than the first rod-specific height position SZ1, as measured from the surface of the object 110. Moreover, in each rod, the third rod-specific height position SZ3 may located at least 1 mm lower than the second rod-specific height position SZ2, as measured from the surface of the object 110.

In an embodiment, the shape of at least some of the cross sections 700 of the blind holes 600 is circular. In an embodiment, the shape of at least some of the large cross sections 700a is circular. In an embodiment, the shape of at least some of the cross sections 700 is oval. In an embodiment, the shape of at least some of the large cross sections 700a is oval. Preferably also the shape of at least some of the small cross sections 700b is circular or oval.

As indicated above, the shape of at least some of the cross sections 700 of the blind holes 600, such as large cross-sections 700a, may be e.g. a polygon, such as regular convex polygon, such a rectangle or a triangle. Also the shape of a small cross-section 700b may be e.g. a polygon, such as regular convex polygon, such a rectangle or a triangle.

In an embodiment, at least some of symbols 520 represent Arabic numerals. In an embodiment, all the symbols 520 represent Arabic numerals. In an embodiment, all the Arabic numerals from 0 to 9 are expressible as the symbols 520 of the wear indicator 510. In an embodiment, the Arabic numerals 2, 3, 4, 5, 6, 7, and 8 are expressible as the symbols 520 of the wear indicator 510. In an embodiment, the Arabic numerals 4, 6, and 8 are expressible as the symbols 520 of the wear indicator 510. In an embodiment, only the Arabic numerals 4, 6, and 8 are expressible as the symbols 520 of the wear indicator 510. In an embodiment, only the Arabic numerals 2, 4, 6, and 8 are expressible as the symbols 520 of the wear indicator 510. In an embodiment, only the Arabic numerals 2, 3, 4, 6, and 8 are expressible as the symbols 520 of the wear indicator 510. In an embodiment, some other symbols, such as letters, are expressible by the wear indicator 510.

To obtain a reasonable amount of information from the wear indicator 510, in an embodiment, the number of different symbols 520 that are expressible by the wear indicator 510 is at least three, at least four, at least five or at least six. Preferably, the number is only seven or at least seven, corresponding to all Arabic numerals from 2 to 8. The number may be ten, corresponding to all Arabic numerals from 0 to 9.

To have a reasonably wide range for wear indication, in an embodiment, the depth (D1 or D2, see FIG. 6d) of a blind hole 600, such as the deepest blind hole, is at least 4 mm, preferably at least 5 mm. In an embodiment, the depth of each of at least four blind holes 600 is at least 4 mm, preferably at least 5 mm. In an embodiment, the depth of each one of at least eleven blind holes 600 is at least 4 mm, preferably at least 5 mm. However, referring to FIGS. 5c and 5d, some of the multiple blind holes may be shallower; in particular, when some of the blind holes are used for indicating the number of tens; e.g. tens of millimetres.

To preserve the hardness of the tread, preferably the aspect ratio (as defined above) of the cross section 700 of the blind holes 600 is at most 7 (i.e. from ⅟7 to 7), at most 5 or at most 3. The aspect ratio of a blind hole is defined in a manner similar to what has been discussed in connection with the rods 200.

The invention claimed is:

1. A tire configured to roll about an axis of rotation in use, the tire comprising:
 a tread configured, in use, to make rolling contact with a surface, the tread defining a wear indicator extending from an outer surface of the tread into the tread, the wear indicator defining at least seven blind holes extending from the outer surface of the tread into the tread in a radial direction perpendicular to the axis of rotation, the at least seven blind holes being shaped such that
 a plurality of distances is defined in between different pairs of cross-sections of the at least seven blind holes in a cross-sectional plane at a depth position, one respective distance of the plurality of distances defined for each pair of cross-sections, wherein
 the cross-sections of the at least seven blind holes lie on the cross-sectional plane of which a surface normal is parallel to the radial direction and which intersects with at least some of the at least seven blind holes,
 a minimum of the plurality of distances is at least 0.5 mm,
 in the radial direction, the cross-sections of at least some of the at least seven blind holes vary such that at a number of different depth positions, the cross-sections of the blind holes at the depth positions collectively define a number of different symbols expressible by the wear indicator, one of the symbols corresponding to one of the depth positions, the number of different depth positions and the number of different symbols being at least two,
 in the radial direction, the cross-sections of at least one of the at least seven blind holes vary such that a first cross-section of the blind hole is larger at a first depth position, a second cross-section of the blind hole is smaller at a second depth position in relation to the first depth position, and a third cross-section of the blind hole is larger at a third depth position in relation to the second depth position,
 the second depth position is located between the first depth position and the third depth position, and
 the varying cross-sections of the at least seven blind holes collectively define one of the different symbols when the cross-sections are at the outer surface of the tread.

2. The tire of claim 1, wherein
the first, larger cross-section fully encompasses the second, smaller part of the cross-section.

3. The tire of claim 2, wherein
an area of the first, larger cross-section or the third, larger cross-section is at least 1.5 times an area of the second, smaller cross-section.

4. The tire of claim 1, wherein
a shape of at least some of the cross-sections is circular, oval, or polygonal.

5. The tire of claim 1, wherein
an aspect ratio of one of the cross-sections of at least one of the at least one seven blind holes is at most seven.

6. The tire of claim 1, wherein
a first one of the at least seven blind holes has a first depth,
a second one of the at least seven blind holes has a second depth, and
the second depth is less than the first depth.

7. The tire of claim 1, wherein
a number of the blind holes is at least thirteen, and/or
a depth of a blind hole is at least 4 mm, and/or
the symbols represent Arabic numerals.

8. The tire of claim 7, wherein the number of blind holes is at least fifteen.

9. The tire of claim 7, wherein the number of blind holes is at least eighteen.

10. The tire of claim 1, wherein each of the symbols is a single alphanumeric character.

* * * * *